Feb. 13, 1962  R. DELL HULL  3,020,666
COMBINATION FISHING ROD, HANDLE AND REEL
Filed Aug. 18, 1958  3 Sheets-Sheet 1
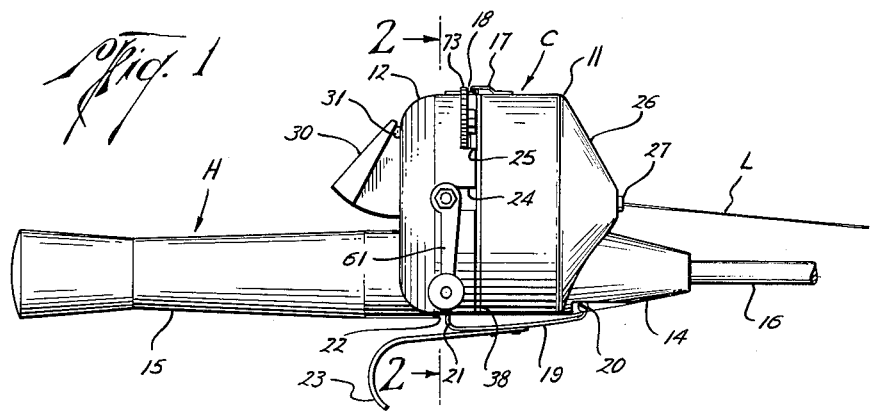
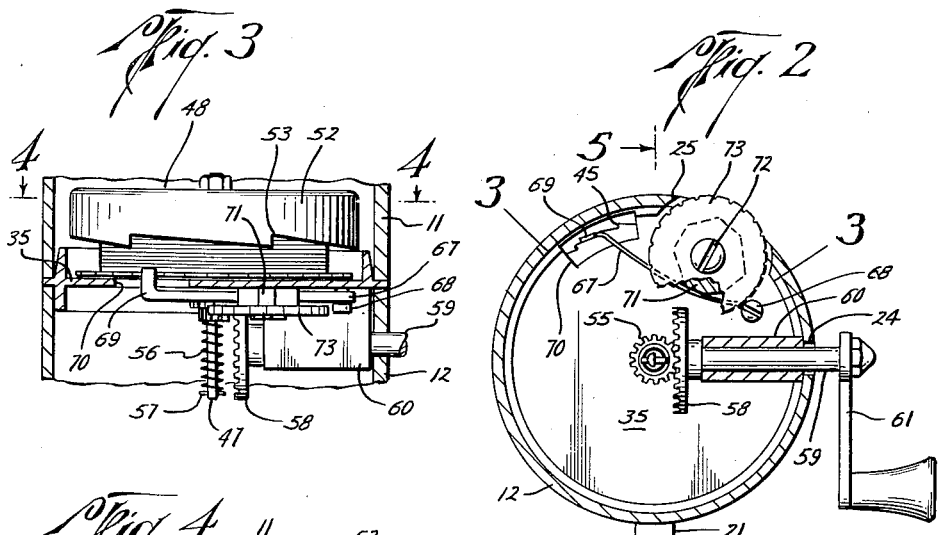
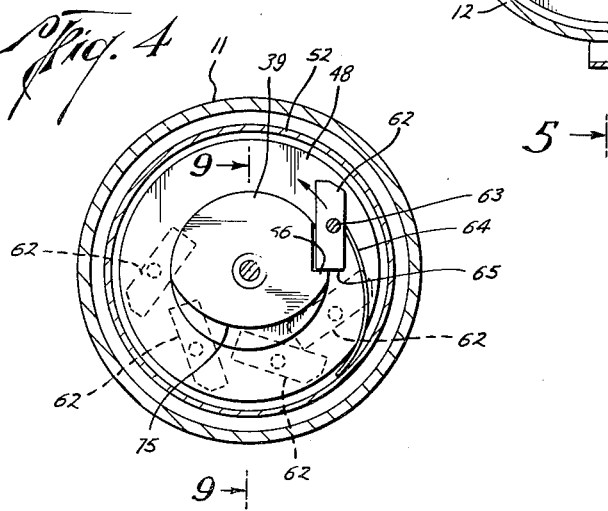
R. Dell Hull
INVENTOR.
BY Pennie Edmonds, Morton Barrows & Taylor
ATTORNEY

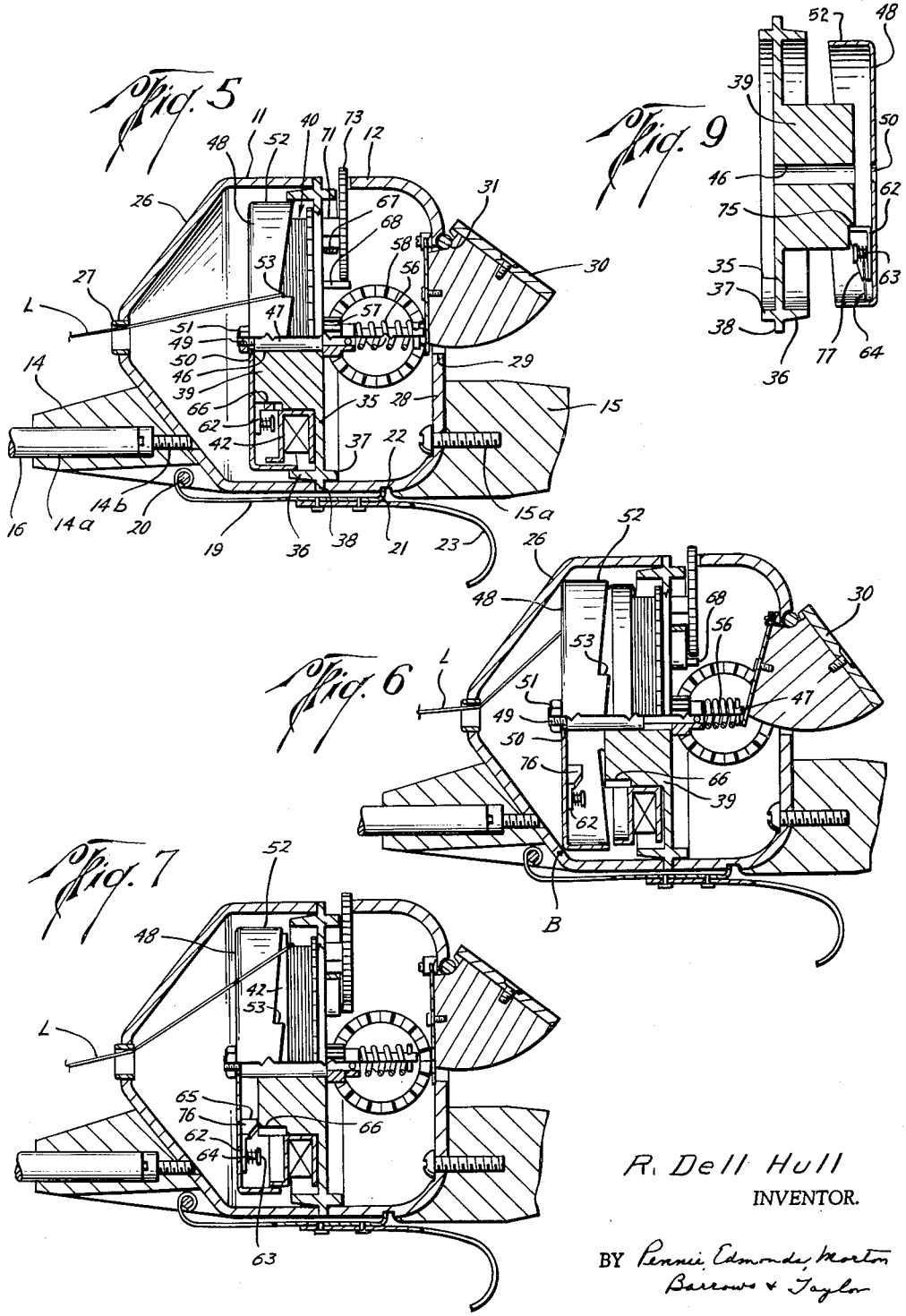

Feb. 13, 1962 R. DELL HULL 3,020,666
COMBINATION FISHING ROD, HANDLE AND REEL
Filed Aug. 18, 1958 3 Sheets-Sheet 3
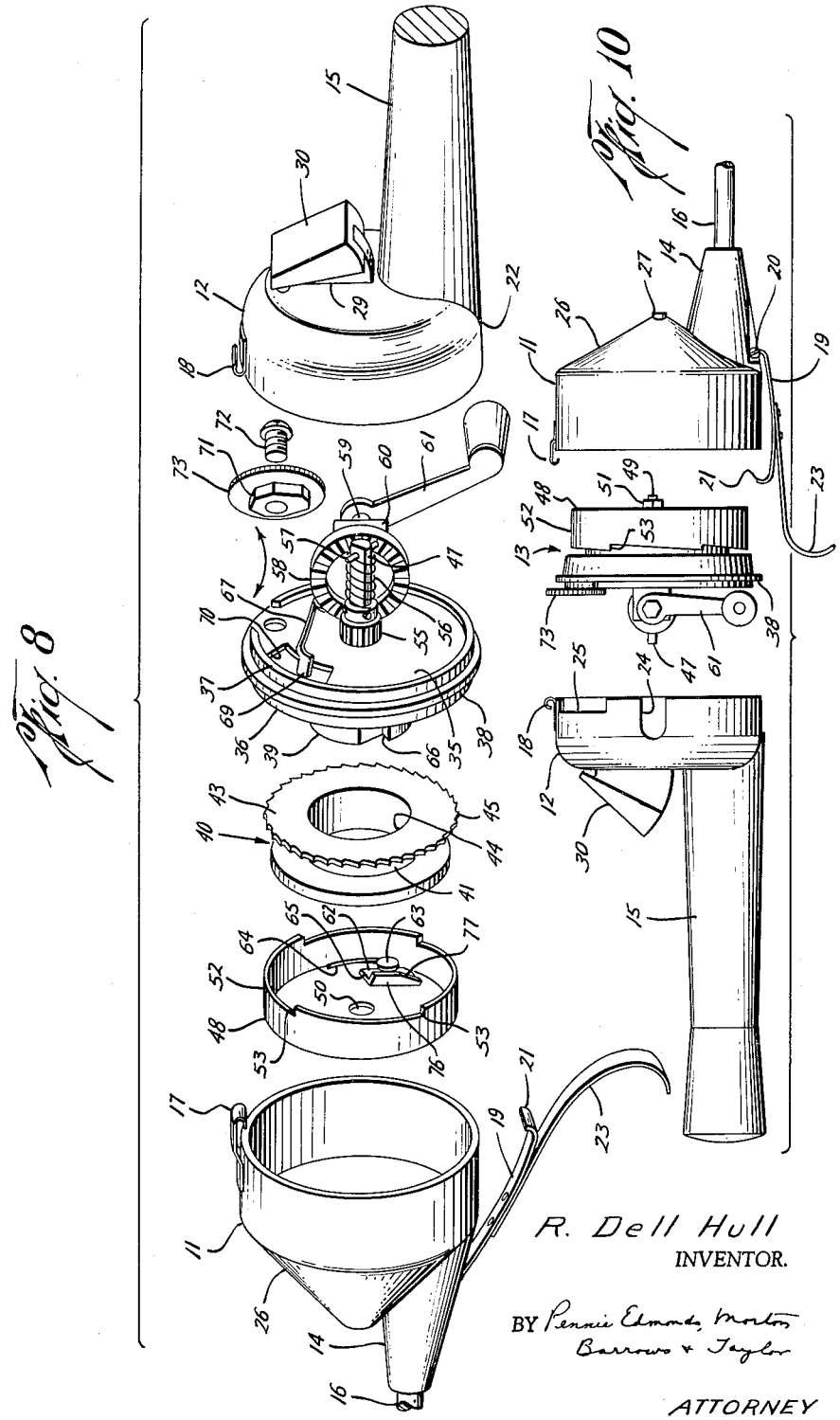
R. Dell Hull
INVENTOR.
BY Pennie Edmonds, Morton
Barrows & Taylor
ATTORNEY United States Patent Office 3,020,666
Patented Feb. 13, 1962

3,020,666
COMBINATION FISHING ROD, HANDLE
AND REEL
R. Dell Hull, 1131 E. Easton St., Tulsa 1, Okla.
Filed Aug. 18, 1958, Ser. No. 755,540
17 Claims. (Cl. 43—20)

This invention relates to a combination fishing rod, handle and reel, and more particularly, to a combination of a fishing rod, handle and a spinning reel of the "closed-face" type.

A primary object of the present invention is to provide a combination fishing rod, handle and reel which is particularly adapted for use by children, women, and others having relatively little experience or skill in fishing by the use of casting or spinning tackle.

An important object is the provision of a combination rod, handle and reel in which the reel portion comprises a spinning reel of the closed-face type disclosed in my U.S. Patents Nos. 2,668,025, 2,675,192 and 2,675,193.

More particularly, a further object of the present invention is to provide a combination rod, handle and closed-face spinning reel in which the reel casing is composed of two parts, each of which is joined with, so as to form a portion of, a two-part rod-handle, the casing parts being so arranged that when joined together to enclose the reel they will form a coupling by which the handle portions will also be joined together to form a unitary structure, the reel, itself, comprising a unitary sub-assembly, being bodily insertable in the casing.

Still other objects are the provision of a simplified form of slipping clutch or drag for the line spool of the reel; an anti-reverse latch to prevent reverse rotations of the line pick-up elements of the reel; and the provision generally of a small, compact, efficient, simply constructed and easily manipulated rod and reel structure.

Other and more specific objects and advantages of this invention will become more readily apparent from the description when read in conjunction with accompanying drawings which illustrate a useful embodiment in accordance with this invention.

In the drawing:

FIG. 1 is a side elevational view of the combination rod and reel structure in accordance with this invention, shown in its assembled operative condition;

FIG. 2 is a transverse sectional view taken generally along line 2—2 of FIG. 1;

FIG. 3 is a top, partly sectional view taken generally along line 3—3 of FIG. 2;

FIG. 4 is a transverse sectional view taken generally along line 4—4 of FIG. 3;

FIGS. 5, 6 and 7 are all views taken generally along line 5—5 of FIG. 2, but showing parts of the reel at different stages of operation thereof;

FIG. 8 is an exploded perspective view of the combined structure;

FIG. 9 is a sectional detail taken generally along line 9—9 of FIG. 4;

FIG. 10 is an exploded view of the rod, handle and reel combination, the reel being shown in its assembled form.

Referring first to FIGS. 1 and 10, which illustrate the elements comprising the primary combination of the rod, handle and reel, there is shown a reel casing of generally cylindrical form comprising a front portion 11 and a rear portion 12 adapted to be separably joined together coaxially as will be more fully described hereinafter, to form the casing C for enclosing a closed-face spinning reel comprising the sub-assembly, designated generally by the numeral 13 (FIG. 10), which is adapted to be bodily inserted as a unit into the casing. Casing portions 11 and 12 are joined directly to forward and rear handle portions 14 and 15, respectively, of a fishing rod handle H, by any suitable means such as the screws 14b and 15a, respectively (FIG. 5). Handle portion 14 constitutes the forward or chuck portion and is provided with a socket 14a (FIG. 5) opening to its forward end and adapted to receive and to have secured therein, by any conventional gripping means (not shown), the butt end of a fishing rod 16 of any suitable and conventional form. Rear handle portion 15 constitutes the grip portion of the handle and is suitably and conventionally shaped and constructed for this purpose, as shown. Casing portions 11 and 12 are adapted to be releasably connected together by means of co-operable hinge clips 17 and 18 mounted on the top of casing portions 11 and 12, respectively, adjacent the abutting ends of the casing portions. An elongate outwardly bowed spring clip 19 is hingedly connected by means of a hinge pin 20 (FIGS. 1, 5 and 10) to a point beneath front portion 14 and is arranged to swing rearwardly and upwardly toward rear casing portion 12. The free end of clip 19 is bent toward the casing to form a curved lip 21 which is insertable in a slot 22 provided in the lower periphery of rear casing portion 12. Spring clip 19 is dimensioned so as to require it to be compressed toward the casing at a point intermediate its ends in order to force lip 21 into slot 22. Upon release of the pressure on the medial portion of spring clip 19, the clip will tend to shorten whereby lip 21 will be pulled toward pivot pin 20 and will thereby exert a pull against the forward edge of slot 22 sufficient to draw the two casing portions tightly together and thereby lock them against separation. Secured to the outer face of clip 19 and extending rearwardly of the handle is a downwardly curving hook member 23 adapted to receive the finger of the user, as is generally conventional in casting reels. Rear casing portion 12 is provided with slots 24 and 25 which are adapted to receive portions of the sub-assembly 13 in order to permit the latter to be properly seated inside the casing and permit operating members thereof to project outside the casing. Forward portion 11 is formed to provide a forwardly tapering, generally conical front face 26, the center of which is pierced by an eye 27 through which the fishing line L passes. The rear wall 28 of rear casing portion 12 is provided with a generally rectangular opening 29 in which a thumb pressure plate 30 has its upper end pivoted on a hinge pin 31, extending transversely of the upper end of opening 29 for swinging movement through the rear wall of casing portion 12 for controlling the operation of the reel, as will be more fully described hereinafter.

The sub-assembly comprising the reel 13 includes a circular base plate 35 adapted to be positioned transversely of casing C and provided on its forward and rear faces with forwardly and rearwardly projecting flanges 36 and 37, respectively, the latter being disposed radially inwardly of the periphery of plate 35 whereby to define an outwardly projecting annular rim 38, the diameter of which is such that when plate 35 is inserted between the portions of casing C, adjacent ends of casing portions 11 and 12 will slidably receive the respective flanges 36 and 37 and the edges of the casing portions will abut the opposite faces of rim 38, whereby to clamp base plate 35 and the reel structure supported thereby between the casing portions when the latter are connected together to form the final operating structure. Plate 35 is provided with a central forwardly projecting cylindrical boss 39 which is preferably integrally formed with plate 35, but which may be otherwise secured to the forward face thereof in any known manner.

A line spool, designated generally by the numeral 40, comprises a hollow hub 41, an annular front flange 42, and an annular rear flange 43. Hub 41 has an axial opening 44 adapted to slidably receive boss 39. The edge of rear flange 43 is provided with ratchet teeth 45, for purposes to be subsequently described.

Boss 39 has an axial bore 46 in which is rotatably and slidably journalled a cylindrical shaft 47 which projects through bore 46 both rearwardly of plate 35 and forwardly of the forward end of boss 39. A line pick-up head 48 is mounted on the forward end of shaft 47 for rotation and axial movement by corresponding movements of shaft 47. The latter has a forwardly extending threaded pin 49 which projects through a central opening 50 in the pick-up head to receive a nut 51 to thereby provide means by which the pick-up head may be releasably secured to shaft 47.

Line pick-up head 48 is generally circular and is formed with a generally cylindrical, rearwardly extending peripheral flange 52 which is adapted to extend rearwardly over the periphery of front flange 42 to a point intermediate flanges 42 and 43 when the pick-up head is in retracted position against the forward end of boss 39. The rearward edge of flange 52 is serrated to form a plurality of angularly spaced notches 53 which are adapted to engage or "pick-up" line L upon appropriate rotation of pick-up head 50 and wind it about hub 41 of line spool 40.

The rearward end of shaft 47 has mounted thereon a spur gear 55 which is suitably splined to the shaft to permit relative longitudinal movement of the shaft through the gear without relative rotation. A coil spring 56 is positioned about the rearward end of shaft 47 and held in compression between gear 55 and a stop pin 57 mounted on the rearward end of shaft 47. Spring 56 serves to urge shaft 47 to its rearward position while at the same time thrusting gear 55 against the rear face of plate 35, which serves as a bearing for the gear. A ring gear 58 is mounted on a drive shaft 59 and is disposed to mesh with spur gear 55. Shaft 59 is suitably journalled in a bearing 60 mounted on the rear face of plate 35 (FIG. 2), and is of a length sufficient to project from the side of casing H when the structure is assembled. The outer end of drive shaft 59 carries a handle 61 by which the shaft may be rotated in order to drive shaft 47 through the inter-meshing gears 55 and 58. Rotation of shaft 47 will, of course, drive pick-up head 48 which will be rotated in counter-clockwise direction (as viewed from the front of the reel), in order to wind the line on the spool.

It is desirable to positively prevent reverse rotation of the pick-up head, particularly where the rod and reel are being manipulated by relatively unskilled persons, and the present structure includes a simple form of anti-reverse device. This device comprises a pawl 62 (FIGS. 4 to 9) which is pivotally supported, by means of a pivot pin 63, on the inner face of pick-up head 48 at a point between the periphery of boss 39 and flange 52. A wire spring 64 (FIGS. 4, 8 and 9) has one end curled about pivot pin 63 and bearing against an upstanding rail 76 provided along one side edge of pawl 62, and the other end bearing against the inner face of flange 52 to normally resiliently bias one end or toe 65 of the pawl radially inwardly toward the periphery of boss 39. The latter has a transverse notch 66 (FIGS. 4 and 8) cut in the surface thereof adapted to receive toe 65 and by engagement therewith to serve as stop for preventing reverse rotation of the pick-up head. The arrow shown in FIG. 4 indicates the normal direction of rotation of the pick-up head when the line is being retrieved. By the pivoted and resiliently biased arrangement of the pawl, it will be seen that when rotation of the pick-up head is in the proper direction, as indicated by the arrow, toe 65 of the pawl will merely ride around the periphery of boss 39, sliding over notch 66, but when reverse rotation of the pick-up head is attempted, toe 65 will drop into notch 66 under the urging of spring 64 (FIG. 4).

As best seen in FIGS. 2, 3 and 8, the reel structure is provided with a "drag" for the line spool in order to regulate the tension, which may be applied to the line before the line spool is permitted to slip on boss 39, in order to prevent breakage under an excessive pull. This drag means comprises a leaf spring 67 pivoted at one end about a pin 68 which projects from the rear face of plate 35. The free end of leaf spring 67 has a forwardly turned head 69 which projects through an arcuate slot or window 70 provided in plate 35 near the periphery thereof opposite a segment of serrated edge 45 of rear flange 43 of the line spool. Head 69, which functions as a brake shoe, is positioned to rest on serrated edge 45 and is urged against this edge by means of a stepped cam 71, which is rotatably mounted on a pin 72 projecting from the rear face of plate 35. Cam 71 is shaped so that as it is rotated about pin 72, it will apply increasing or decreasing pressure, depending upon the direction of rotation, against leaf spring 67, which will, in turn, transmit this pressure in the form of frictional drag of head 69 on edge 45 of the line spool flange. A knurled drive disk 73 is secured to cam 71 and arranged to have its knurled periphery projecting through opening 25 to the exterior of the casing at a point at one side and near the top of the casing, as shown (FIG. 1), where it may be readily contacted by the thumb or finger of the operator for adjusting the tension on the drag spring. The serrations on edge 45 co-operate with head 69 to provide a clicking sound when the tension on the fishing line is great enough to overcome the resisting pressure of drag spring 67 and rotate the spool around boss 39.

The sub-assembly 13, comprising all of the reel structure carried on base plate 35, as heretofore described, is insertable bodily in casing C. Ordinarily, the sub-assembly will be inserted in rear portion 12, drive shaft 59 being slipped into notch 24, and drag disk 73 fitted into notch 25, as best seen in FIG. 1. Line L will, of course, be threaded through eye 27 and the forward portion of the casing will be hooked to the rear portion by means of the clips 17 and 18 and the parts locked in their assembled position by means of spring clip 19. When the casing portions, their attached handle portions and the reel structure, have thus been assembled, the inner end of pressure plate 30 will normally rest against the rearward end of shaft 47 in position to be manipulated in the casting and retrieving operations of the reel.

The operations of the reel will now be described, reference being had particularly to FIGS. 5, 6 and 7 which illustrate several stages in the operation. Referring first to FIG. 5 which illustrates the position of the reel parts when the line is being retrieved and wrapped about spool 40, it will be noted that pick-up head 48 has moved to its rearmost position at which it bears against the forward end of boss 39 and line L is engaged in one of the notches 53. FIG. 6 shows the first step of the casting position, which is also a temporary braking position for holding the line against outward movement. Pressure will have been applied to pressure plate 30 to move the latter inwardly of the casing, whereby the forward end of the pressure plate will urge shaft 47 forwardly to thereby move pick-up head 48 forwardly until its forward peripheral edge engages the inner wall of front face 26 of the casing along a circular line of contact indicated at B. The engagement of the forward edge of the pick-up head with the casing will serve to grip the line between the head and front face 26 and thereby stop its outward movement. Thus the line and the lure attached thereto can be held against outward movement while the casting movement of the rod is begun. Thumb pressure is relieved from pressure plate 30 and spring 56 will act on shaft 47 to draw pick-up head 48 rearwardly out of contact with the wall of the casing, thereby freeing the line for outward movement. The cast may then be made, this occurring contemporaneously with the release of thumb pressure on plate 30.

When pick-up head 48 is moved outwardly, as previously noted, pawl 62 will also be moved out in front of the forward end of boss 39, as seen in FIG. 6. When the pressure on thumb plate 30 is relaxed to release the line, the pawl will have been rotated by the pressure of spring 64 to a point which will be radially inwardly of the periphery of boss 39 (as indicated in the broken line position of pawl 62 at the left-hand side of FIG. 4) with the result that pawl 62 will engage the forward face of boss 38 (FIG. 7) and prevent pick-up head from returning to its rearmost position (FIG. 5), thereby holding the notched edge of flange 52 in front of front flange 42 of the line spool, as best seen in FIG. 7. In this position notches 53 will be held out of the path of movement of line L, which will be flowing over flange 52 as the cast is being made.

When the cast has been completed, it is necessary for the pick-up head to be retracted to its maximum rearward position, as shown in FIG. 5, in order to retrieve the line. It is necessary, therefore, to remove pawl 62 from its engagement with the front face of boss 39 in order to allow this further retractive movement of the pick-up head. This additional retraction is effected upon the initial rotation of the pick-up head in the pick-up direction by the provision of guide elements arranged on the front face of boss 39 and an adjacent portion of pawl 62. This guiding mechanism is best seen in FIGS. 4 and 9. In FIG. 4, it will be seen that the front face of boss 39 has been cut away along a segment thereof adjacent its periphery to form a shallow arcuate ledge 75 which merges into the periphery of boss 39 at spaced points, one of which is adjacent notch 66. Rail 76, which extends along the inner edge of pawl 62 and is tapered forwardly at 77 toward the end of the pawl opposite toe 65, is adapted to engage ledge 75 when rotation of the pick-up head in the line-retrieving direction is initiated. The shape of ledge 75 in cooperation with rail 76 will cause the toe of the pawl to swing outwardly against the resistance of spring 64 and to ride up ledge 75 on to the periphery of boss 39, whereupon the pick-up head will be freed to be moved rearwardly by the tension of spring 56 to reassume the position shown in FIG. 5, at which point it again rests against the forward end of boss 39. Continued rotation of the pick-up head in the retrieving direction will retrieve the line, and since pawl 62 is now riding on the periphery of boss 39, it will be in position to drop into notch 66 in the event the operator should attempt to reverse rotation of the pick-up head.

From the foregoing, it will be seen the present invention provides a compact, simply constructed combination reel and rod handle which may be easily and quickly assembled and disassembled, which is substantially foolproof in operation, rendering it especially useful for operation by persons such as children and women who are relatively unskilled in the handling of fishing tackle of the type requiring casting from a reel. The closed-face type of spinning reel assures absence of back-lash, and the anti-reverse mechanism herein described prevents confusing operation on the part of the unskilled users, and all of the other features contribute to the provision of a fishing device which fulfills the objects of the invention referred to above.

It will be understood that various alterations, modifications, and changes may be made in the details of the illustrative embodiment within the scope of the appended claims, but without departing from the spirit of this invention.

I claim:

1. In a fishing reel, rod and handle combination, the improvement comprising a front casing member and a rear casing member together forming substantially the entire casing for the reel, clip means at opposite sides of the casing for releasably securing the members thereof together, a reel assembly including a line spool, a line pick-up head and means for rotating the latter all mounted on a base plate, cooperating flange means on said base plate and on said front and rear casing members, said base plate and reel assembly being positioned between said casing members and being supported by said cooperating flange means upon assembly of said front and rear cover members, said reel assembly being substantially completely enclosed by said casing members, a rod mounted in the forwardly extending portion of the front casing member, and a handle secured to and extending rearwardly from said rear casing member, said base plate having a forwardly extending boss thereon, said spool being mounted for rotation on said boss, said boss having an irregular front end, said pick-up head carrying means cooperating with said irregular front end of said boss to prevent rotation of said pick-up head in one direction with respect to said boss.

2. A combination according to claim 1 in which said cooperating means carried by said pick-up head comprises a spring urged pawl and in which said boss has a step or tooth therein engaged by said pawl when said pick-up head tends to turn in one direction to prevent further relative turning in said one direction.

3. A combination according to claim 2 in which said pick-up head is mounted for axial movement relative to the spool, in which is included means for effecting such relative axial movement of the pick-up head, said means for effecting such relative axial movement extending through the rear casing member for engagement by a user of the combination, and in which said boss has a cutaway portion to permit the pawl to move back up on the boss following forward movement of the head, release thereof and rotation thereof.

4. A rod, handle and reel casing combination comprising a front casing member including a forwardly extending rod receiving portion and a rod mounted therein, a rear casing member having a handle secured thereto, clip means at opposite sides of said casing members for releasably securing the members together, said clip means comprising interlocking clip members at the top of the casing members, one being secured to each casing member, and a spring clip member secured to the bottom of one of said casing members and adapted to releasably engage a part of the other casing member to releasably secure the casing members together, said spring clip means including a finger grip member extending rearwardly of the casing and adjacent the lower side of the handle.

5. In a fishing reel, rod and handle combination, the improvement comprising a front casing member and a rear casing member together forming substantially the entire casing for the reel, clip means at opposite sides of the casing for releasably securing the members thereof together, a reel assembly including a line spool, a line pick-up head and means for rotating the latter all mounted on a base plate, cooperating flange means on said base plate and on said front and rear casing members, said base plate and reel assembly being positioned between said casing members and being supported by said cooperating flange means upon assembly of said front and rear cover members, said reel assembly being substantially completely enclosed by said casing members, a rod mounted in the forwardly extending portion of the front casing member, and a handle secured to and extending rearwardly from said rear casing member, said clip means comprising interlocking clip members at the top of the casing, one being secured to each casing member, and a spring clip member secured to the bottom of one of said casing members and adapted to engage a part of said other casing member to releasably secure the casing members together.

6. In a fishing reel, rod and handle combination, the improvement comprising a front casing member and a rear casing member together forming substantially the entire casing for the reel, clip means at opposite sides of the casing for releasably securing the members thereof together, a reel assembly including a line spool, a line pick-up head and means for rotating the latter all mounted on a base plate, cooperating flange means on said base plate and on said front and rear casing members, said base plate and reel assembly being positioned between said casing members and being supported by said cooperating flange means upon assembly of said front and rear cover members, said reel assembly being substantially completely enclosed by said casing members, a rod mounted in the forwardly extending portion of the front casing member, and a handle secured to and extending rearwardly from said rear casing member, said reel assembly including a combined adjustable spool, drag and click mechanism, said drag and click mechanism including an operating disk rotatably mounted on the base plate, a portion of the periphery of the disk extending through an opening in a casing member for operating engagement by a user.

7. A combination according to claim 6 in which the rear flange of said spool is provided with integral ratchet teeth about its periphery, and said drag and click mechanism includes a resilient member, an end of which engages said ratchet teeth.

8. In a fishing reel, rod and handle combination, the the improvement comprising a front casing member having a wall defining a rearward opening, a rear casing member having a wall defining a forward opening, a reel mechanism substantially completely housed within the assembled casing members, a base member mounting said reel mechanism, said base member having flange means extending forward and rearward for reception of the walls of said casing members, said flange means being received inside the walls of said casing members, said base member further having a radially outwardly extending flange lying between the walls of said casing members, said casing members being positioned in axially aligned relationship by said forward and rearward extending flange means, a rod mounted by said front casing member, a handle mounted on said rear casing member, and means to secure said front casing member to said back casing member, whereby the base member is secured in assembled position between said casing members, said base member being an integral element of the load-bearing structure comprising, in series, said handle, said rear casing member, said base member, said front casing member and said rod.

9. The combination of claim 8, in which the casing members have a principal axis, the rod and handle members are mounted substantially coaxially in offset relation to and below said principal axis, and said means to secure includes cooperating clip means on said casing members above and below said principal axis and substantially in the plane defined by said principal axis and the axis of the rod and handle.

10. In a fishing reel, rod and handle combination, the improvement comprising a front casing member having a wall defining a rearward opening, a rear casing member having a wall defining a forward opening, a reel mechanism substantially completely housed within the assembled casing members, a base member mounting said reel mechanism, said base member having portions interposed between said casing members and clamped in place by abutting engagement with said casing members, a rod mounted on said front casing member, a handle mounted on said rear casing member, said base member being an integral element of the load-bearing structure comprising, in series, said handle, said rear casing member, said base member, said front casing member and said rod, and mutually interengaging securing means on said front and rear casing members bridging said base member and holding the casing members in predetermined relative positions in which the base member is secured therebetween by clamping, the entire assembly, including said casing members and said base member being held in assembled relation by said securing means.

11. The combination of claim 10, in which the casing members and base member have mutually cooperating axially extending flange-like surfaces maintaining said members in predetermined axial alignment.

12. The combination of claim 10, in which the reel mechanism includes a winding shaft extending transversely from said base member, and one of said casing members is provided with a longitudinal slot in its wall for the reception of said winding shaft.

13. The combination of claim 10, in which the reel mechanism includes reel control means, said control means includes a manipulating disc of relatively small diameter in relation to the size of said base member, said disc is mounted for rotation on said base member about a longitudinal axis and has a peripheral portion projecting transversely outward of said base member, and one of said casing members is provided with a recess in its wall to receive the projecting portion of said disc.

14. The combination of claim 13, in which said casing members define a principal reel axis disposed above said rod and handle, and said manipulating disc has its projecting portion exposed for access at the upper portion of the reel and toward the side thereof from which the reel is wound, substantially in the area where the thumb of the operator's hand falls during proper palming of the reel.

15. In a fishing reel, rod and handle combination, the improvement comprising a front casing member and a rear casing member together forming substantially the entire casing for a reel, a reel assembly including a line spool, a line pick-up head and means for rotating the latter all mounted on a base plate, cooperating flange means on said base plate and on said front and rear casing members, mutually interengaging securing means bridging said base plate and securing said front casing member to said rear casing member, means comprising said cooperating flange means and said front and rear casing member for clamping said base plate and reel assembly in position between said casing members when said casing members are secured to each other, said base plate and reel assembly being enclosed substantially completely by said casing members, a rod mounted in a forwardly extending portion of the front casing member, and a handle secured to and extending rearwardly from said rear casing member, said base plate being an integral element of the load-bearing structure comprising, in series, said handle, said rear casing member, said base plate, said front casing member and said rod.

16. In a fishing reel combination, the improvement comprising a front casing member and a rear casing member together forming substantially the entire casing for the reel, mutually interengaging securing means at opposite sides of the casing for releasably securing the members thereof together, a reel assembly including a line spool, a line pick-up head and means for rotating the latter all mounted on a base plate, cooperating flange means on said base plate and on said front and rear casing members, said base plate and reel assembly being positioned between said casing members and being supported by said cooperating flange means upon assembly of said front and rear cover members, said reel assembly being substantially completely enclosed by said casing members, said securing means bridging said base plate and holding the casing members in predetermined relative positions in which the base plate is secured therebetween by clamping, said base plate being an integral element of the casing structure comprising, in series, said rear casing member, said base plate, and said front casing member.

17. In a fishing reel combination, the improvement comprising a front casing member having a wall defining a rearward opening, a rear casing member having a wall defining a forward opening, a reel mechanism substantially completely housed within the assembled casing members, a base member mounting said reel mechanism, said base member having flange means extending forward and rearward for reception of the walls of said casing member, said flange means being received inside the walls of said casing members, said base member further having a radially outwardly extending flange lying between the walls of said casing members, said casing members being positioned in axially aligned relationship by said forward and rearward extending flange means, and mutually interengaging securing means on said casing bridging said base member and holding the casing members in predetermined relative positions in which the base member is secured therebetween by clamping, said base member being an integral element of the casing structure comprising, in series, said rear casing member, said base member, and said front casing member.

References Cited in the file of this patent

UNITED STATES PATENTS

| | | |
|---|---|---|
| 2,299,156 | Lind | Oct. 20, 1942 |
| 2,521,543 | Shakespeare et al. | Sept. 5, 1950 |
| 2,668,025 | Hull | Feb. 2, 1954 |
| 2,752,717 | Lind | July 3, 1956 |
| 2,776,803 | Shakespeare et al. | Jan. 8, 1957 |
| 2,783,952 | Clay | Mar. 5, 1957 |
| 2,828,927 | Yeada | Apr. 1, 1958 |
| 2,834,559 | Nagy | May 13, 1958 |
| 2,863,616 | Hutchison et al. | Dec. 9, 1958 |